(12) United States Patent
Hwang et al.

(10) Patent No.: US 10,756,315 B2
(45) Date of Patent: Aug. 25, 2020

(54) HEAT-RADIATING CARTRIDGE AND ELECTRIC CAR BATTERY PACK USING SAME

(71) Applicant: AMOGREENTECH CO., LTD., Gimpo-si (KR)

(72) Inventors: Seung Jae Hwang, Incheon (KR); Sang Dong Jeong, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 21 days.

(21) Appl. No.: 16/095,806

(22) PCT Filed: May 22, 2017

(86) PCT No.: PCT/KR2017/005281
§ 371 (c)(1),
(2) Date: Oct. 23, 2018

(87) PCT Pub. No.: WO2017/209423
PCT Pub. Date: Dec. 7, 2017

(65) Prior Publication Data
US 2019/0131598 A1    May 2, 2019

(30) Foreign Application Priority Data

May 30, 2016 (KR) .......... 10-2016-0066365
May 30, 2016 (KR) .......... 10-2016-0066616
May 30, 2016 (KR) .......... 10-2016-0066619

(51) Int. Cl.
*H01M 10/613* (2014.01)
*H01M 2/10* (2006.01)
(Continued)

(52) U.S. Cl.
CPC .......... *H01M 2/1016* (2013.01); *H01M 2/10* (2013.01); *H01M 10/653* (2015.04);
(Continued)

(58) Field of Classification Search
CPC .......... H01M 2/1016; H01M 10/613
See application file for complete search history.

(56) References Cited

U.S. PATENT DOCUMENTS

2006/0214631 A1* 9/2006 Yoon .......... H01M 2/1061
320/112
2009/0220853 A1* 9/2009 Yang .......... H01M 2/0277
429/159

FOREIGN PATENT DOCUMENTS

KR   20090052505   5/2009
KR   20090107443   10/2009
(Continued)

OTHER PUBLICATIONS

International Search Report—PCT/KR2017/005281 dated Aug. 16, 2017.

*Primary Examiner* — Olatunji A Godo
(74) *Attorney, Agent, or Firm* — Cantor Colburn LLP

(57) ABSTRACT

Provided is a heat-radiating cartridge that improves heat-radiating capability, does not cause deformation, and has excellent rigidity, and a battery pack for an electric vehicle using the same. The heat-radiating cartridge includes: first and second guide members that support both longitudinal sides of a battery and are spaced apart from each other; third and fourth guide members connected to both ends of the first and second guide members, respectively, to be in contact with both end electrode terminals of the battery; and a seating portion formed on a sidewall of a battery receiving penetration hole formed in a central area by the first to fourth guide members to seat the battery, wherein the seating portion is protruded from the side wall of the battery receiving penetration hole so as to horizontally divide the battery receiving penetration hole into two.

10 Claims, 11 Drawing Sheets

(51) Int. Cl.
   *H01M 10/6553*   (2014.01)
   *H01M 10/653*    (2014.01)
   *H01M 10/6551*   (2014.01)
   *H01M 10/658*    (2014.01)

(52) U.S. Cl.
   CPC ..... *H01M 10/658* (2015.04); *H01M 10/6551* (2015.04); *H01M 10/6553* (2015.04)

(56) References Cited

FOREIGN PATENT DOCUMENTS

| | | |
|---|---|---|
| KR | 20120025566 | 3/2012 |
| KR | 20120054807 | 5/2012 |
| KR | 20120133655 | 12/2012 |
| KR | 20130023039 | 3/2013 |
| KR | 101272516 | 6/2013 |
| KR | 20160016502 | 2/2016 |
| KR | 20160016516 | 2/2016 |

* cited by examiner

HEAT-RADIATING CARTRIDGE AND ELECTRIC CAR BATTERY PACK USING SAME

TECHNICAL FIELD

The present disclosure relates to a heat-radiating cartridge, and more particularly, to a heat-radiating cartridge that improves heat-radiating capability, does not cause deformation, and has excellent rigidity, and a battery pack for an electric vehicle using the same.

BACKGROUND ART

In recent years, demand for thin-type energy storage devices such as electric vehicles, portable telephones, notebooks, and digital cameras is also rapidly increasing.

In such a thin-type energy storage device, a secondary battery is used, and a lithium secondary battery capable of achieving high energy density and high output driving is increasingly used as the secondary battery.

The lithium secondary battery is made of a pouch-type battery to achieve a thin-type structure, and it is advantageous that a large capacity battery can be obtained in a small area by connecting a plurality of pouch-type batteries.

Here, when a plurality of pouch-type batteries are connected, the capacity increases, but the heat generated when each battery is charged and discharged is concentrated in a small area, which makes it difficult to stably drive the batteries for a long time.

At present, it is necessary to develop a technology for extracting the heat of the pouch-type battery to the outside.

Korean Patent Application Publication No. 2009-0107443 (Patent Document 1) discloses a heat-radiating plate interposed between battery cells. The heat-radiating plate for a battery cell module, includes a composite sheet in which a matrix resin is filled with a thermally conductive filler, and carbon fibers which are inserted into the composite sheet wherein the carbon fibers are inserted to extend from an inside of the composite sheet to an edge of the heat-radiating plate.

When the heat-radiating plate of Patent Document 1 is inserted between battery cells to stack the battery cells, the thickness of the stacked module becomes thicker as the thickness of the heat-radiating plate is increased. Accordingly, since it is not possible to stack a large number of batteries in the same area, there is a disadvantage that the battery capacity is reduced.

DISCLOSURE

Technical Problem

The present disclosure has been made in view of the above-mentioned problems, and it is an object of the present disclosure to provide a heat-radiating cartridge capable of mounting a larger number of batteries in the same area and maximizing heat-radiating efficiency and a battery pack for an electric vehicle using the same.

Another object of the present disclosure is to provide a heat-radiating cartridge excellent in rigidity without causing deformation and a battery pack for an electric vehicle using the same.

Another object of the present disclosure is to provide a heat-radiating cartridge capable of stacking a larger number of batteries in the same area and insulating electrode terminals of the batteries and conductive connecting members connected to the electrode terminals of the batteries, and a battery pack for an electric vehicle using the same.

Another object of the present disclosure is to provide a heat-radiating cartridge capable of efficiently radiating heat generated from a battery and a battery pack for an electric vehicle using the same.

Another object of the present disclosure is to provide an assembly-type heat-radiating cartridge that can easily connect and assemble a larger number of batteries in the same area, and a battery pack for an electric vehicle using the same.

Another object of the present disclosure is to provide an assembly-type heat-radiating cartridge capable of maximizing heat-radiating efficiency and a battery pack for an electric vehicle using the same.

Technical Solution

In order to achieve one of the objects, according to an aspect of the present disclosure, there is provided a heat-radiating cartridge comprising: first and second guide members that support both longitudinal sides of a battery and are spaced apart from each other; third and fourth guide members connected to both ends of the first and second guide members, respectively, to be in contact with both end electrode terminals of the battery; and a seating portion formed on a sidewall of a battery receiving penetration hole formed in a central area by the first to fourth guide members to seat the battery, wherein the seating portion is protruded from the side wall of the battery receiving penetration hole so as to horizontally divide the battery receiving penetration hole into two.

Here, the first and second guide members are made of a metal material having excellent thermal conductivity, and the third and fourth guide members are made of a plastic material, wherein, when the third and fourth guide members are insert injection molded, both ends of the third and fourth guide members are integrally connected with the first and second guide members.

Also, the first guide member may be polished on a side surface of which contacts a heat exchanger, and an exposed outer surface of the second guide member may be formed to have heat-radiating irregularities.

The heat-radiating cartridge further includes a thermal interface material (TIM) coated on the polished side surface of the first guide member and an emissive coating layer formed on the outer surface of the second guide member to have heat-radiating irregularities, to thereby increase heat-radiating performance.

The first and second guide members may be formed of a thermally conductive non-insulating plastic, and the third and fourth guide members may be formed of a thermally conductive insulating plastic.

In this case, the third and fourth guide members may be formed only in a region that is in contact with both-end electrode terminals of the battery, and the first to fourth guide members may be formed by a double-shot injection molding scheme of the thermally conductive non-insulating plastic and the thermally conductive insulating plastic.

The thermally conductive non-insulating plastic may include an electrically conductive heat-radiating filler dispersed therein, and the thermally conductive insulating plastic may include an insulating heat-radiating filler dispersed therein.

The heat-radiating cartridge may further include conductive connecting members provided at portions of the third and fourth guide members that are in contact with both end electrode terminals of the battery for electrical connecting with a battery that is seated between adjacent heat-radiating cartridges.

The heat-radiating cartridge may further include a thermal interface material (TIM) formed on the surface of the seating portion.

The first and second guide members may be made of aluminum.

The first and second guide members may be detachably coupled with and the third and fourth guide members, respectively. In this case, the first and second guide members may be coupled with the third and fourth guide members by using a coupling groove and a coupling bar.

According to another aspect of the present disclosure, there is provided a battery pack for an electric vehicle, the battery pack including: a plurality of heat-radiating cartridges stacked in a vertical direction or disposed adjacent to each other in a horizontal direction; and a plurality of batteries inserted and disposed between the plurality of heat-radiating cartridges, wherein each of the plurality of heat-radiating cartridges includes first and second guide members that support both longitudinal sides of the batteries and are spaced apart from each other; third and fourth guide members connected to both ends of the first and second guide members, respectively, to be in contact with both end electrode terminals of the batteries; and a seating portion formed on a sidewall of a battery receiving penetration hole formed in a central area by the first to fourth guide members to seat the batteries, wherein the seating portion protrudes from the side wall of the battery receiving penetration hole to horizontally divide the battery receiving penetration hole into two.

The battery pack for an electric vehicle may further include a heat exchanger contacting a polished side surface of the first guide member to perform heat exchange.

The battery may be a pouch-type.

Advantageous Effects

According to the present disclosure, the heat-radiating cartridge is realized by insert injection molding of the first and second guide members on the third and fourth guide members formed of engineering plastics. Accordingly, the heat-radiating cartridge may include the third and fourth guide members formed of engineering plastics to improve rigidity and to have excellent reliability because no deformation occurs.

In addition, since the heat-radiating cartridge includes first and second guide members having excellent thermal conductivity, the heat generated from the battery can be efficiently discharged.

According to the present disclosure, the outer surface of the first guide member constituting the heat-radiating cartridge is polished, and the heat-radiating irregularities is formed on the outer surface of the second guide member, thereby maximizing the heat-radiating ability.

According to the present disclosure, since one heat-radiating cartridge has a thickness substantially equal to one battery thickness, it is possible to house a larger number of batteries in the same area in a battery pack in which a plurality of heat-radiating cartridges are stacked, to provide an advantage that the battery pack can be made slimmer, thinner, and higher capacity.

According to the present disclosure, the heat-radiating cartridge is implemented by double-shot injection of a cartridge main body of a thermally conductive non-insulating plastic and a heat conductive insulating member of a thermally conductive insulating plastic, so that the heat-radiating cartridge can be electrically insulated although the electrode terminals of the battery and the conductive connecting members connected to the electrode terminals contact the heat-radiating plastic.

That is, while the battery is mounted on the heat-radiating cartridge, the electrode terminals of the battery and the conductive connecting members can be kept in an insulated state by contacting the thermally conductive insulating member.

In addition, in the present disclosure, the heat-radiating cartridge is made of the thermally conductive non-insulated plastic and the thermally conductive insulating plastic, and the heat generated from the battery can be quickly radiated through the heat-radiating cartridge.

According to the present disclosure, an assembly-type heat-radiating cartridge is assembled by combining the first and second guide members with the third and fourth guide members formed of plastic, to simplify a manufacturing process and obtain a reproducible product.

BEST MODE

Figure 1:
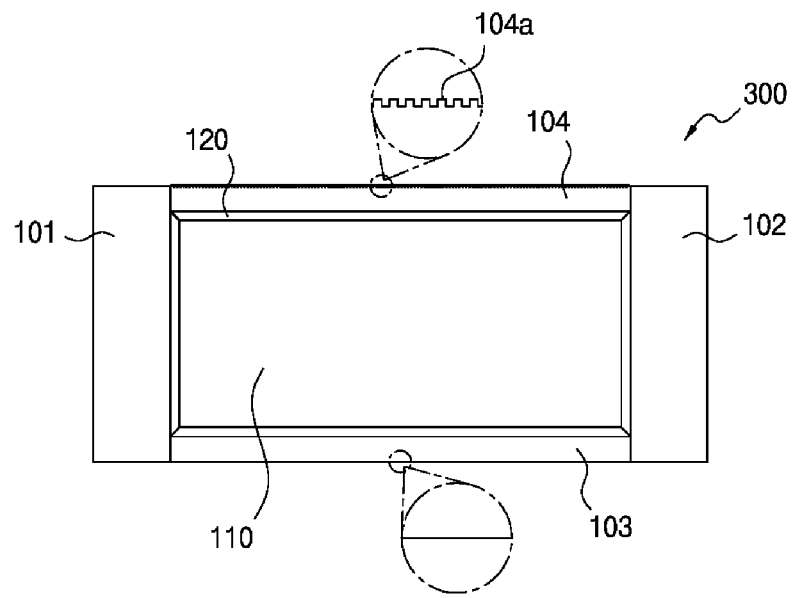
FIG. 1 is a plan view of a heat-radiating cartridge according to a first embodiment of the present disclosure.

Hereinafter, embodiments of the present disclosure will be described in detail with reference to the accompanying drawings.

First, in a heat-radiating cartridge according to an embodiment of the present disclosure, a battery receiving penetration hole is formed at a central portion to receive a pouch-type battery. The battery receiving penetration hole is formed in a rectangular shape corresponding to the pouch-type battery, and a rectangular ring shape is realized as an integral-type or assembly-type by using four guide members, to form the rectangular shape battery receiving penetration hole.

In a pouch-type battery, generally, electrode terminals protrude from both end portions having a short length among four sides of a rectangular shape. The heat-radiating cartridge includes first and second guide members contacting both longitudinal sides of the pouch-type battery, and third and fourth guide members which are formed in the longitudinal direction and are in contact with electrode terminals of the pouch-type battery and are connected to or engaged with both ends of the first and second guide members.

The first to fourth guide members constituting the heat-radiating cartridge according to the embodiment of the present disclosure are preferably made of a thermally conductive material so as to efficiently discharge heat generated from the battery, and are preferably made of a material which is lightweight but is able to maintain strength and is excellent in injection moldability.

In this case, the first and second guide members, which are in contact with both side surfaces in the longitudinal direction of the pouch-type battery, may be formed of engineering plastics, thermally conductive non-insulating plastic, or a metal material having excellent thermal conductivity, and the third and fourth guide members formed in the longitudinal direction may be formed of engineering plastics or thermally conductive insulating plastic.

Further, when the heat-radiating cartridge according to the embodiment of the present disclosure is constructed as a high capacity battery pack like a battery pack for an electric vehicle, a plurality of heat-radiating cartridges are stacked, and pouch-type batteries are inserted and accommodated between the stacked heat-radiating cartridges, respectively.

In this case, the pouch-type batteries respectively accommodated between the adjacent heat-radiating cartridges are accommodated in battery-receiving penetration holes of the adjacent heat-radiating cartridges in a ratio of 1/2, and, in consideration of this, a seating portion for receiving the battery is protruded on the inner wall of the battery receiving penetration hole of each heat-radiating cartridge while horizontally dividing the battery receiving penetration hole into two.

In some embodiments, the thickness of the heat-radiating cartridge is substantially equal to the thickness of the battery when the battery pack for an electric vehicle is implemented by repeating an assembling process of mounting the battery in the heat-radiating cartridge and stacking the plurality of heat-radiating cartridges, and thus a battery pack for an electric vehicle having the same thickness as the stacked batteries can be manufactured. As a result, in some embodiments of the present disclosure, it is possible to obtain a slim, lightweight, and high capacity battery pack for an electric vehicle.

Figure 2:
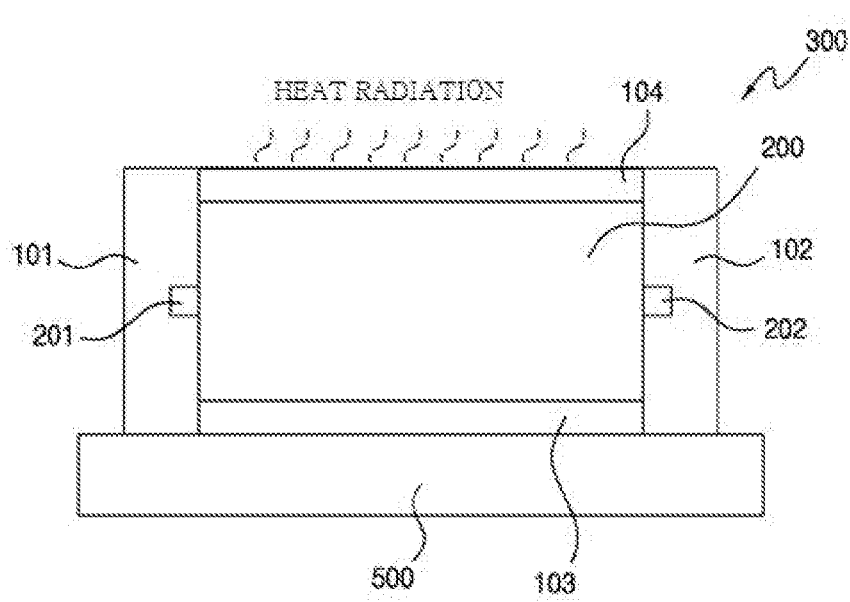
FIG. 2 is a schematic diagram for explaining a state in which a heat exchanger is in contact with a heat-radiating cartridge in which a battery is mounted according to the first embodiment of the present disclosure.

FIG. 1 shows a heat-radiating cartridge according to a first embodiment of the present disclosure. FIG. 2 illustrates a state in which a heat exchanger is in contact with a heat-radiating cartridge in which a battery is mounted according to the first embodiment of the present disclosure.

First, referring to FIG. 1, a heat-radiating cartridge 300 according to a first embodiment of the present disclosure includes third and fourth guide members 101 and 102 formed of, for example, engineering plastics and spaced apart from each other; a first guide member 103 insert-injection-molded on the third and fourth guide members 101 and 102 and polished on a side surface of which is in close contact with a heat exchanger; and a second guide member 104 insert-injection-molded on the third and fourth guide members 101 and 102 and spaced apart from the first guide member 103.

The heat-radiating cartridge 300 includes a rectangular battery receiving penetration hole 110 formed in a central region and a seating portion 120 formed on a sidewall of the battery receiving penetration hole 110 to seat a battery 200.

That is, in the first embodiment of the present disclosure, the first and second guide members 103 and 104 are insert injection molded into the third and fourth guide members 101 and 102, thereby implementing a rectangular ring-shaped heat-radiating cartridge 300 including the third and fourth guide members 101 and 102 and the first and second guide members 103 and 104. Accordingly, a rectangle-shaped battery 200 is mounted in the seating portion 120 of the battery receiving penetration hole 110 of the heat-radiating cartridge 300 (see FIG. 2).

Here, the heat-radiating irregularities 104a may be formed on the side surface exposed to the outside of the second guide member 104.

Therefore, the heat-radiating cartridge according to the first embodiment of the present disclosure includes the third and fourth guide members 101 and 102 formed of engineering plastics, to have high rigidity, difficult occurrence of deformation, and excellent reliability.

In addition, engineering plastics have excellent properties such as impact resistance, abrasion resistance, heat resistance, cold resistance, chemical resistance and electrical insulating as well as strength and elasticity.

However, the third and fourth guide members 101 and 102 of the heat-radiating cartridge according to the first embodiment are not limited to engineering plastics, and can employ any thermoplastic resins having heat conductivity and insulating and having moldability.

In addition, the heat-radiating cartridge according to the first embodiment of the present disclosure is provided with first and second guide members 103 and 104 having high thermal conductivity so as to have excellent heat-radiating characteristics, and can efficiently discharge heat generated from the battery.

In addition, the outer surface of the first guide member 103 may be polished so that the surface roughness of the heat-radiating cartridge according to the embodiment of the present disclosure may be lowered and the outer surface of the polished first guide member 103 may be attached to the heat exchanger 500. Accordingly, the heat of the battery 200 transferred to the first guide member 103 can be quickly radiated through the heat exchanger 500.

That is, even if the outer surface of the first guide member 103 is in close contact with the heat exchanger 500 due to the presence of fine irregularities on the outer surface of the first guide member 103 before being polished, the cooling efficiency of the first guide member 103 is lowered due to an air layer formed between the heat exchanger and the first guide member 103.

Therefore, in some embodiments of the present disclosure, by removing the fine irregularities formed on the outer surface of the first guide member 103 through the polishing process, the outer surface of the first guide member 103 is more firmly attached to the heat exchanger 500 so that the heat-radiating power of the heat released from the battery 200 can be increased.

It is preferable that the first and second guide members 103 and 104 should be made of an aluminum material having excellent thermal conductivity and low cost.

In addition, in some embodiments of the present disclosure, the heat-radiating irregularities 104a are formed on the side surface of the second guide member 104 exposed to the outside. These heat-radiating irregularities 104a increase the contact area with the outside air and improve the heat-radiating efficiency of the heat transmitted to the second guide member 104.

That is, as shown in FIG. 2, when the battery 200 mounted on the heat-radiating cartridge 300 is applied to an electronic device such as an electric car or a mobile phone, heat is generated by charging and discharging of the battery 200, and the heat is cooled by the heat exchanger 500 that is in close contact with the first guide member 103 of the heat-radiating cartridge 300 and is radiated through the heat-radiating irregularities 104a (see FIG. 1) in the second guide member 104 having the surface exposed to the outside, to thereby improve the heat-radiating efficiency.

In addition, in some embodiments of the present disclosure, the outer surface of the second guide member 104 having the heat-radiating irregularities 104a 1 may further be spin coated with a material having excellent heat-radiating property so as to maximize the heat-radiating efficiency.

The spin coating is for further maximizing the radiating property of the heat transmitted to the second guide member 104. The second guide member 104 is coated with a ceramic material having heat-radiating and insulating properties or a material having heat-radiating and non-insulating properties.

The ceramic material having heat-radiating and insulating properties may include at least one of boron nitride (BN), alumina, magnesia, silicon oxide, silicon carbide, titanium carbide, silicon nitride and aluminum nitride.

In addition, the material having heat-radiating and non-insulating properties may include at least one of graphite, carbon, and carbon nanotube (CNT).

Figure 3:
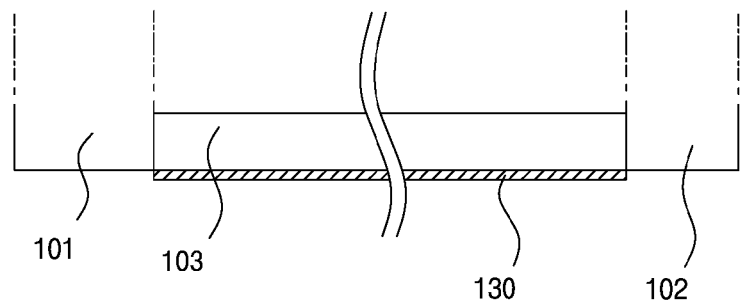
FIG. 3 is a cross-sectional view schematically showing a state in which a thermal interface material (TIM) is formed on a first guide member of a heat-radiating cartridge according to the first embodiment of the present disclosure.

The battery 200 has a pair of electrode terminals 201 and 202 protruded at both ends thereof Referring to FIG. 3, a thermal interface material (TIM) 130 may be coated on the side surface of the first guide member 103 with which the heat exchanger 500 is in close contact (see FIG. 2).

Here, the polishing process may be performed on the side surface of the first guide member 103, or the polishing process may not be performed thereon.

Thus, the TIM 130 coated on the side surface of the first guide member 103 reduces the contact heat resistance with the heat exchanger 500 and the air layer between the heat exchanger 500 and the first guide member 103 as many as possible, so that heat can be smoothly discharged to the heat exchanger 500.

As the type of the TIM 130, a material which can be coated such as a heat-radiating grease, a thermally conductive adhesive, and the like can be used.

Figure 4:
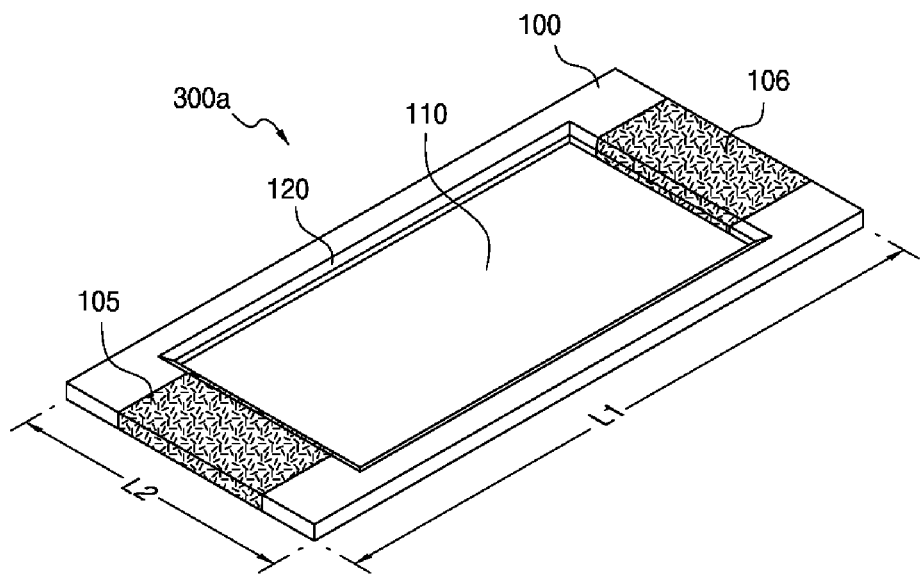
FIG. 4 is a perspective view of a heat-radiating cartridge according to a second embodiment of the present disclosure.
Figure 5:
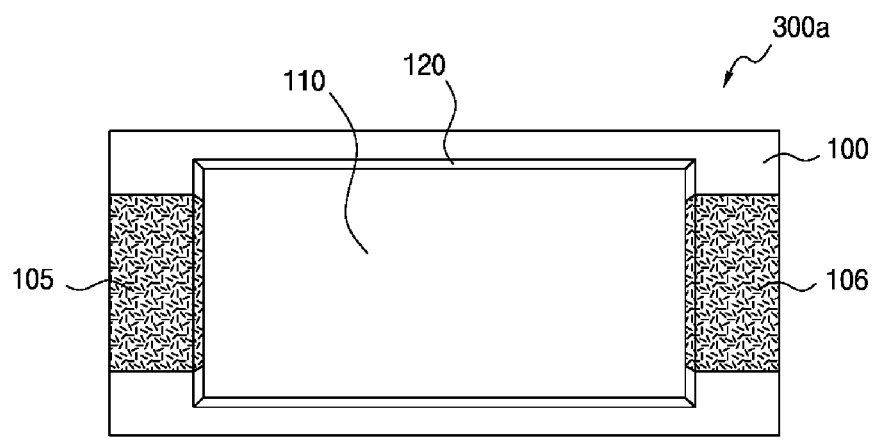
FIG. 5 is a plan view of the heat-radiating cartridge according to the second embodiment of the present disclosure.

Referring to FIGS. 4 and 5, the heat-radiating cartridge 300a according to the second embodiment of the present disclosure includes a cartridge main body 100 formed of a thermally conductive non-insulating plastic; and thermally conductive insulating members 105 and 106 which are made by double-shot injection molding a thermally conductive insulating plastic to the cartridge main body 100, so as to be insulated when contacting the electrode terminals 201 and 202 of the battery 200 (refer to FIG. 6) and the conductive connecting members connected to the electrode terminals of the battery 200.

The heat-radiating cartridge 300a according to the second embodiment is provided with a rectangular battery receiving penetration hole 110 to receive a rectangular battery 200 (see FIG. 6) in a central area of the heat-radiating cartridge 300a. A seating portion 120 for seating the battery 200 (see FIG. 6) is formed on a side wall of the battery receiving penetration hole 110.

To this end, the cartridge main body 100 of the heat-radiating cartridge 300a has a rectangular ring-shape for guiding the rectangular battery 200 mounted on the seating portion 120 and the thermally conductive insulating members 105 and 106 are partially double-shot injection molded in a short-side region of the cartridge main body 100 with which the electrode terminals 201 and 202 (see FIG. 6) of the battery 200 are in contact.

A pouch-type battery 200 is used in a battery pack for an electric vehicle. The pouch-type battery 200 has a rectangular shape other than a square shape, in which two sides opposite to each other are longer than two other sides opposite to each other, and has a pair of electrode terminals 201 and 202 protruded from both ends of the pouch-type battery 200.

However, the shapes of the battery 200 and the battery receiving penetration hole 110 of the cartridge main body 100 may be formed in a square shape instead of a rectangular shape, and the shape may be modified as necessary.

The cartridge main body 100 has a rectangular ring shape having a rectangular battery receiving penetration hole 110 in its central region to accommodate the battery 200, in which a pair of long side members are longitudinally opposite to each other and made of a thermally conductive non-insulating plastic, and a pair of short-side members are longitudinally opposite to each other, are in contact with the pair of electrode terminals 201 and 202 of the battery 200 and are made of a thermally conductive insulating plastic.

In this case, the pair of short-side members formed of the thermally conductive insulating plastic may be connected so as to be perpendicular to both ends of the pair of long side members formed of the thermally conductive non-insulating plastic.

Figure 6:
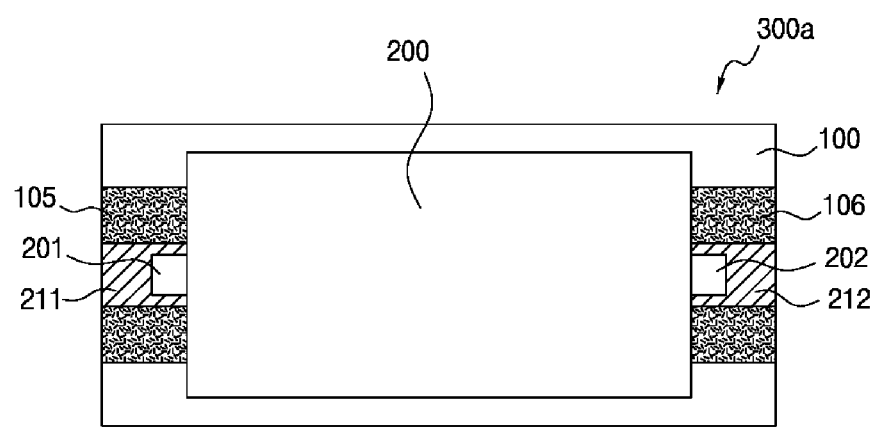
FIG. 6 is a plan view showing a state in which a battery is mounted in the heat-radiating cartridge according to the second embodiment of the present disclosure.

In addition, referring to FIGS. 4 to 6, the cartridge main body 100 is extended in the direction perpendicular to both ends of the long side members and then the pair of short-side members formed of a thermally conductive insulating plastic can be disposed and connected partially in only a region where the pair of electrode terminals 201 and 202 of the battery 200 are in contact and the pair of short-side members constitute the thermally conductive insulating members 105 and 106.

Therefore, in some embodiments of the present disclosure, by embodying the heat-radiating cartridge 300a in which the cartridge main body 100 of the heat conductive non-insulating plastic and the heat conductive insulating members 105 and 106 of the heat conductive insulating plastic are heterogeneously double-shot injection molded, the heat generated from the battery 200 can be rapidly radiated through the heat-radiating cartridge 300a. Further, even when the electrode terminals 201 and 202 of the battery 200 and the conductive connecting members 211 and 212 (see FIG. 6) connected to the electrode terminals 201 and 202 are in contact with a heat-radiating plastic, the former can be electrically insulated from the latter.

When the battery has a rectangular shape, as shown in FIGS. 4 and 5, the battery receiving penetration hole 110 of the cartridge main body 100 also has a rectangular shape, and the cartridge main body 100 is also preferably formed into a rectangular ring shape.

Here, the thermally conductive insulating members 105 and 106 are preferably heterogeneously double-shot injection molded into the short-side region L2 rather than the long side region L1 of the cartridge main body 100.

As shown in FIG. 6, the thermally conductive insulating members 105 and 106 are preferably heterogeneously double-shot injection molded into a region where the electrode terminals 201 and 202 of the battery 200 contact (the short-side region of the heat-radiating cartridge) and a region where the conductive connecting members connected to the electrode terminals are wrapped and contact (the short-side region of the heat-radiating cartridge).

As a result, even if the electrode terminals 201 and 202 and the conductive connecting members 211 and 212 are brought into contact with the thermally conductive insulating members 105 and 106, electric short-circuit is not generated due to the insulating property of the thermally conductive insulating members 105 and 106.

The seating portion 120 is a protrusion protruding from the side wall of the battery receiving penetration hole 110 so as to horizontally divide the side wall of the battery receiving penetration hole 110 into two, and is connected to the cartridge main body 100 and the thermally conductive insulating members 105 and 106, respectively.

The battery is preferably an electrochemically chargeable and dischargeable pouch-type battery which is a thin energy storage device capable of providing high energy density and high output driving. The pouch-type battery is manufactured by putting and sealing two electrodes, a separator and an electrolyte into a rectangular pouch.

The thermally conductive non-insulating plastic uses a moldable electrically non-insulating resin in which an electrically conductive heat-radiating filler made of a material such as graphene or carbon is dispersed. The thermally conductive insulating plastic uses a moldable electrically insulating resin in which an insulating heat-radiating filler such as BN, AlN, MgO, $Al_2O_3$, or $SiO_2$ is dispersed. The thermally conductive non-insulating plastic and the thermally conductive insulating plastic may use, for example, a LUCON 9000 series which is a product of LG Chemical Co., Ltd., which is manufactured by using a thermoplastic resin such as polyphenylene sulfide (PPS), polycarbonate (PC), polyamide (PA) or polypropylene (PP) as a base.

Therefore, the cartridge main body 100 is made of a thermally conductive non-insulating plastic, and the thermally conductive insulating members 105 and 106 are made of the thermally conductive insulating plastic, respectively, through a double-shot injection molding process to mold the heat-radiating cartridge 300a.

Therefore, the heat-radiating cartridge 300a containing the heat-radiating pillar can radiate the heat generated by the charging/discharging of the battery. Here, the heat exchanger 500 (see FIG. 2) cools the heat transferred to the heat-radiating cartridge 300a. The heat exchanger 500 may use any heat exchanger capable of lowering the temperature of the heat-radiating cartridge 300a such as an air-cooling type heat exchanger such as a cooling fan and a water-cooling type heat exchanger using cooling water.

Accordingly, in some embodiments of the present disclosure, the battery 200 is mounted on the heat-radiating cartridge 300a, and heat generated from the battery can be efficiently radiated.

FIG. 6 shows a state in which a battery is mounted in a heat-radiating cartridge according to a second embodiment of the present disclosure.

Referring to FIG. 6, when the battery 200 is mounted on the cartridge main body 100 and the electrode terminals 201 and 202 of the battery 200 are brought into contact with the thermally conductive insulating members 105 and 106, thereby maintaining an electrically insulating state with the cartridge main body 100 made of the thermally conductive non-insulating plastic.

The electrode terminals 201 and 202 are electrically connected to the conductive connecting members 211 and 212 for connecting to the electrode terminals of the battery 200 mounted on the neighboring heat-radiating cartridge. Here, the conductive connecting members 211 and 212 are wrapped and in contact with the heat conductive insulating members 105 and 106 to keep an electrically isolated state from the heat-radiating cartridge.

Figure 7:
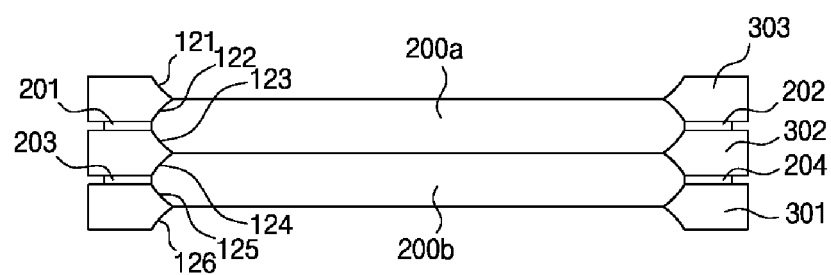
FIG. 7 is a cross-sectional view showing a state in which batteries are mounted in the heat-radiating cartridges stacked according to the first and second embodiments of the present disclosure.

FIG. 7 shows a state in which batteries are mounted in the heat-radiating cartridges stacked according to the first and second embodiments of the present disclosure.

Referring to FIG. 7, a plurality of batteries 200a and 200b are mounted on upper and lower seating portions 121 and 122, 123 and 124, and 125 and 126 formed in the inner wall of the battery accommodating penetration hole of the plurality of heat-radiating cartridges 301, 302, and 303, at a state where the plurality of heat-radiating cartridges 301, 302 and 303 are stacked.

Here, each of the plurality of heat-radiating cartridges 301, 302, and 303 has upper and lower seating portions 121 and 122, 123 and 124, and 125 and 126 formed on the inner wall of the battery receiving penetration hole.

Here, the batteries 200a and 200b is inserted between adjacent heat-radiating cartridges 301 and 302, and 302 and 303, respectively, and stacked. FIG. 7 shows a large-capacity battery pack in which batteries 200a and 200b and heat-radiating cartridges 301, 302, and 303 are stacked in a horizontal state.

For example, after the lower edge of the battery 200b is seated on the upper seating portion 125 of the heat-radiating cartridge 301, the lower seating portion 124 of the heat-radiating cartridge 302 is brought into contact with the upper edge of the battery 200a, and a method of laminating the heat-radiating cartridge 302 on the heat-radiating cartridge 301 is used. That is, the batteries 200a and 200b are mounted between the adjacent heat-radiating cartridges 301, 302, and 303 while stacking a plurality of heat-radiating cartridges 301, 302, and 303.

Therefore, according to some embodiments of the present disclosure, since one heat-radiating cartridge has a thickness substantially equal to one battery thickness, it is possible to house a larger number of batteries in the same area in a battery pack in which a plurality of heat-radiating cartridges are stacked, to provide an advantage that the battery pack can be made slimmer, thinner, and higher capacity.

Figure 8:
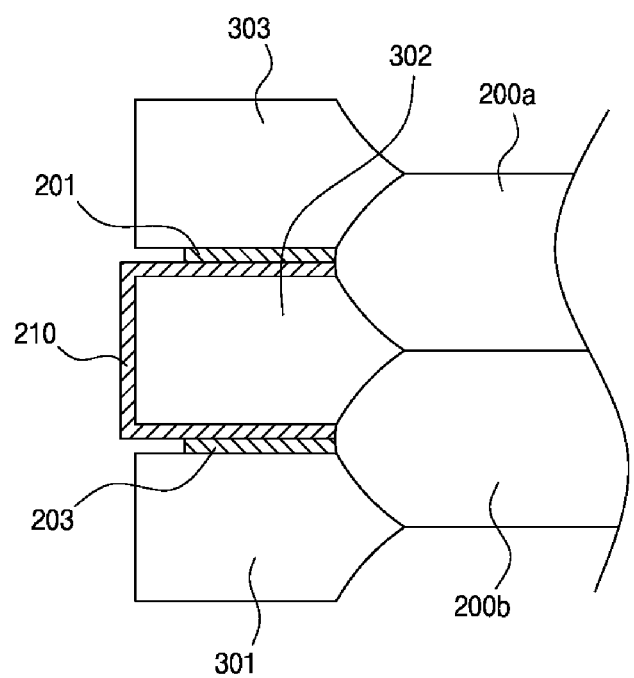
FIG. 8 is a partial cross-sectional view illustrating a state in which the batteries are electrically connected to each other in the stacked heat-radiating cartridges according to the first and second embodiments of the present disclosure.

The electrode terminals 201, 202, 203, and 204 disposed at both ends of the plurality of batteries 200a and 200b are positioned between the heat-radiating cartridges 301, 302 and 303. In this case, as shown in FIG. 8, the electrode terminals 201 and 203 formed on one side of the plurality of batteries 200a and 200b are electrically connected to the conductive connecting member 210 disposed to surround the heat-radiating cartridge 302.

Here, in the first embodiment, the area of the heat-radiating cartridge 302 surrounded by the conductive connecting member 210 correspond to the third and fourth guide members 101 and 102 (see FIG. 1) formed of engineering plastics having electric insulating, and thus even if the connecting member 210 is brought into contact with the third and fourth guide members 101 and 102, no electric short-circuiting state occurs.

In addition, in the second embodiment, the area of the heat-radiating cartridge 302 surrounded by the conductive connecting member 210 correspond to the thermally conductive insulating members 105 and 106. Even if the conductive connecting member 210 is brought into contact with the thermally conductive insulating members 105 and 106, no electric short-circuiting state occurs.

Figure 9:
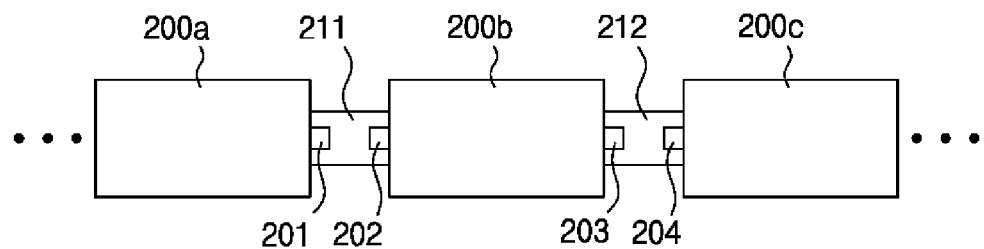
FIG. 9 is a conceptual view for explaining a state where the batteries are connected to the conductive connecting members according to the first and second embodiments of the present disclosure.

FIG. 9 conceptually indicates a state where the batteries are connected to the conductive connecting members according to the first and second embodiments of the present disclosure.

Referring to FIG. 9, the electrode terminals 201, 202, 203, and 204 of a plurality of batteries 200a, 200b, and 200c are connected in series by using the conductive connecting members 211 and 212 before being mounted on a plurality of heat-radiating cartridges 301 to 303, and then the plurality of batteries 200a, 200b, and 200c are mounted on the plurality of heat-radiating cartridges 301 to 303.

The conductive connecting members 211 and 212 can be realized by conductive lines made of a metal material such as Cu having an excellent electrical conductivity or electrically connected components including the conductive lines. For example, a Cu electrode line film, a flexible PCB, or the like can be used as the conductive connecting members.

Figure 10:
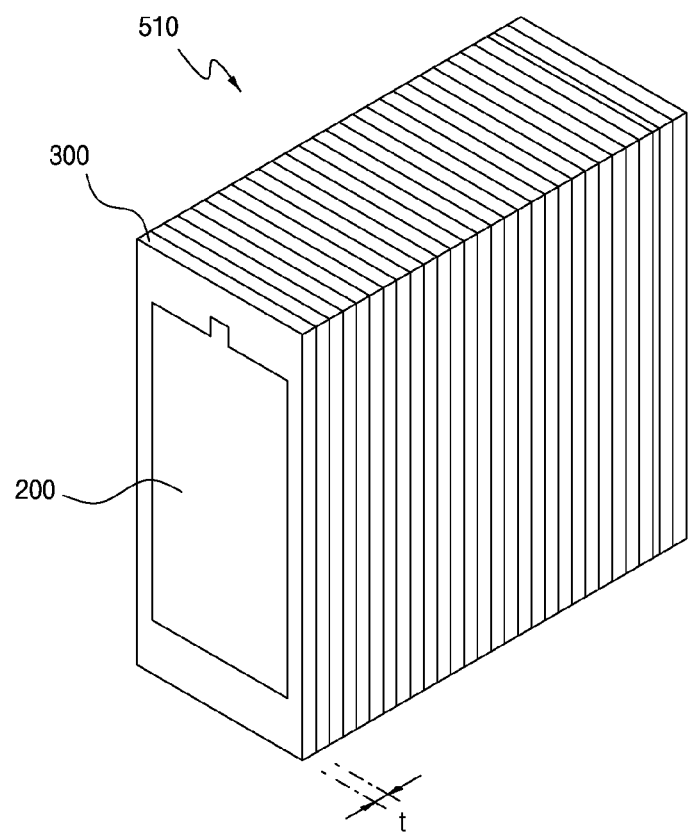
FIG. 10 is a conceptual perspective view of a battery pack for an electric vehicle according to the first embodiment of the present disclosure.

Therefore, as shown in FIG. 10, the heat-radiating cartridge 300 according to the first embodiment of the present disclosure can be implemented as a plurality of heat-radiating cartridges which are stacked to insert batteries 200 between adjacent heat-radiating cartridges 300, to thus constitute an electric vehicle battery pack 510. The battery pack 510 shown in FIG. 10 shows a state in which the plurality of heat-radiating cartridges 300 and the plurality of batteries 200 are stacked and assembled in the horizontal direction as shown in FIG. 7, and then rotated by 90 degrees.

Figure 11:
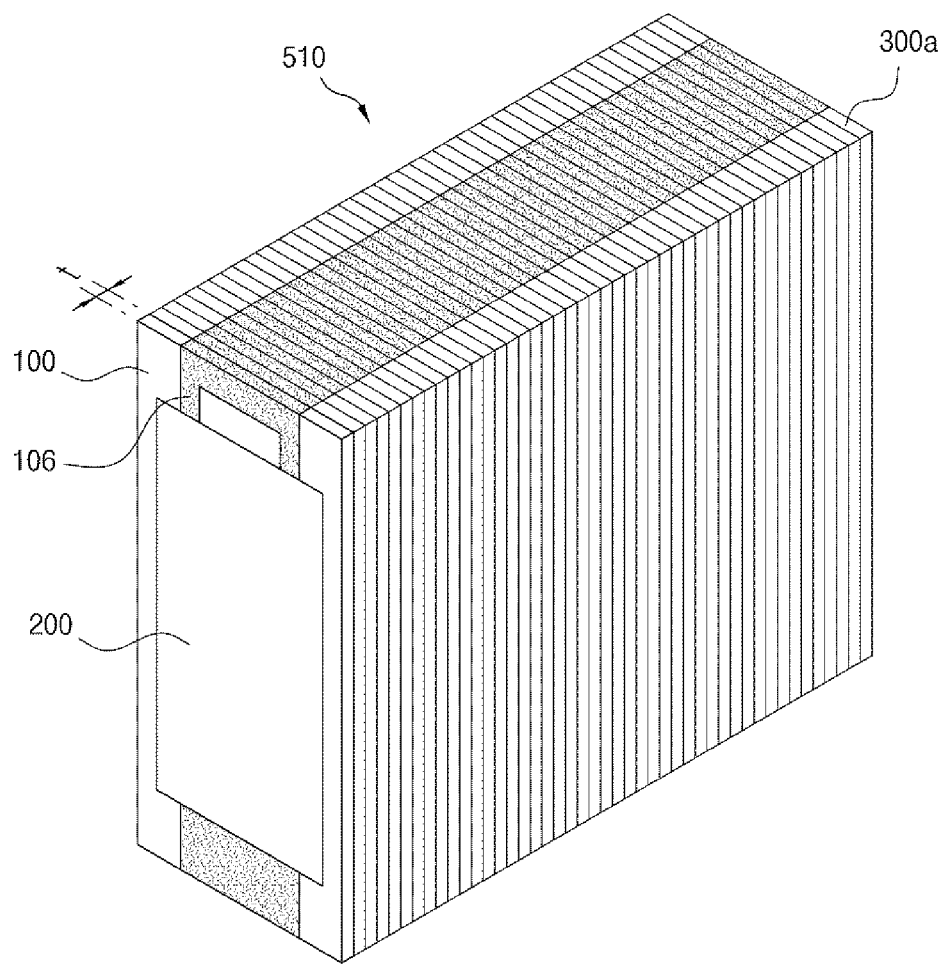
FIG. 11 is a conceptual perspective view of a battery pack for an electric vehicle according to the second embodiment of the present disclosure.

As shown in FIG. 11, a plurality of heat-radiating cartridges 300a according to the second embodiment are stacked to insert batteries 200 between adjacent heat-radiating cartridges 300a as in the first embodiment, to thus constitute an electric vehicle battery pack 510.

For reference, FIGS. 10 and 11 schematically illustrate the battery pack 510, in which the conductive connecting members connected to the electrode lines of the batteries 200 are not shown, and the electrode terminals of the batteries 200 are arranged in the vertical direction.

As described above, in some embodiments of the present disclosure, the battery pack 510 for an electric vehicle can be implemented by repeating the assembly process of mounting the batteries 200 on the heat-radiating cartridges 300 and 300a and laminating the heat-radiating cartridges 300 and 300a. Therefore, the battery pack 510 for an electric vehicle, which has the thickness which is substantially the same as the thickness of the stacked batteries (that is, the thickness t of one of the heat-radiating cartridges 300 of FIG. 10 is substantially the same as the thickness of one of the batteries 200) is manufactured, and it is advantageous to obtain a slim, thin and high-capacity battery pack 510 for an electric vehicle.

For example, when 150 batteries are mounted on a battery pack for an electric vehicle, 149 heat-radiating fins or heat-radiating plates are required in the case that the battery pack is implemented through heat-radiating fins such as aluminum fins or prior art heat-radiating plates between the batteries. Therefore, the battery pack cannot be made slim and thin. In addition, since batteries cannot be assembled as many as 149 heat-radiating fins or heat-radiating plates in the battery pack, the battery capacity is reduced.

Figure 12A:
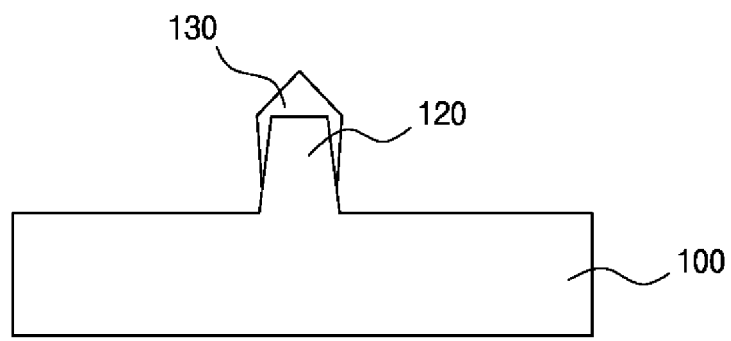
FIGS. 12A and 12B are partial cross-sectional views illustrating a state where a TIM is coupled to a seating portion of a heat-radiating cartridge according to the second embodiment of the present disclosure.

In addition, referring to FIG. 12A, a thermal interface material (TIM) 130 may be insert-injected into the seating portion 120 of the cartridge main body 100 of the heat-radiating cartridge.

Figure 12B:
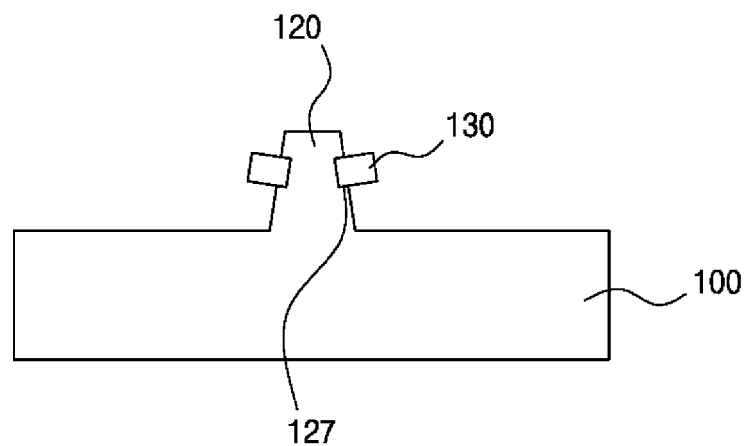

As shown in FIG. 12B, a coupling groove 127 may be formed in the seating portion 120 of the cartridge main body 100, and the TIM 130 may be coupled to the coupling groove 127.

Thus, when the TIM 130 is insert-injected into the seating portion 120 of the cartridge main body 100 or is coupled to the coupling groove, the contact thermal resistance is reduced and the air layer between the pair of batteries is reduced, to thereby smoothly discharge heat to an external heat exchanger.

The TIM 130 may be of various types such as a heat-radiating grease, a heat-radiating sheet, a metal plate, a thermally conductive adhesive, and the like.

In the second embodiment, the cartridge main body 100 serve as substantially the same function as the first and second guide members 103 and 104 of the first embodiment, and the thermally conductive insulating members 105 and 106 serve as substantially the same function as the third and fourth guide members 101 and 102 of the first embodiment. However, there is a difference between the manufacturing method and the characteristics depending on the difference in materials constituting the first to fourth guide members.

The third embodiment of the present disclosure discloses a technique for manufacturing a heat-radiating cartridge capable of mounting a battery and efficiently discharging heat generated from the battery by a simple assembling process.

Figure 13:
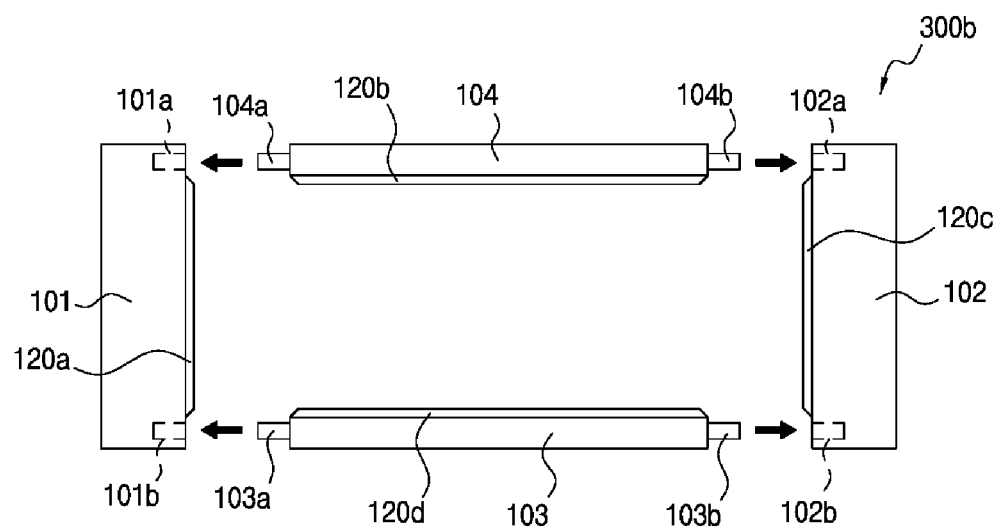
FIG. 13 is a conceptual plan view for explaining a process of assembling an assembly-type heat-radiating cartridge according to a third embodiment of the present disclosure.
Figure 14:
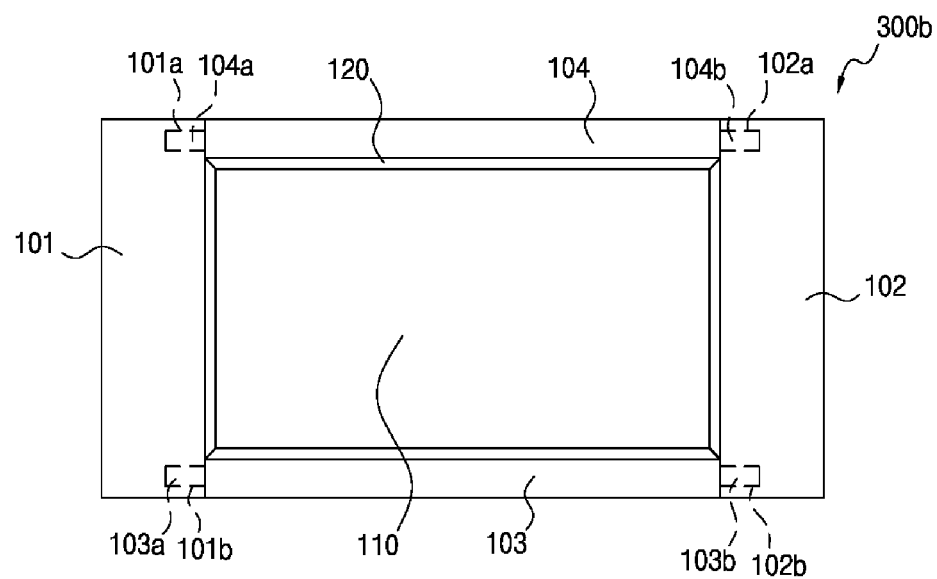
FIG. 14 is a plan view illustrating a state where the assembly-type heat-radiating cartridge according to the third embodiment of the present disclosure is assembled.

FIG. 13 is an exploded plan view for explaining a process of assembling an assembly-type heat-radiating cartridge according to a third embodiment of the present disclosure. FIG. 14 shows an assembled state of the heat-radiating cartridge.

Referring to FIGS. 13 and 14, the assembly-type heat-radiating cartridge according to the third embodiment of the present disclosure includes: for example, third and fourth guide members 101 and 102 formed of a plastic and spaced apart from each other; and first and second guide members 103 and 104 coupled to both ends of the third and fourth guide members 101 and 102.

The assembly-type heat-radiating cartridge 300b according to the third embodiment of the present disclosure is different from the heat-radiating cartridge 300 according to the first embodiment depending upon an assembly-type or an integration-type.

In the first embodiment, the third and fourth guide members 101 and 102 and the first and second guide members 103 and 104 are manufactured by the insert injection molding method and integrated. In the third embodiment, the third and fourth guide members 101 and 102 and the first and second guide members 103 and 104 are separately manufactured and then assembled, to form a heat-radiating cartridge.

That is, in the assembly-type heat-radiating cartridge according to the third embodiment, the third and fourth guide members 101 and 102 and the first and second guide members 103 and 104 are separately manufactured, respectively. Then, the third and fourth guide members 101 and 102 formed of a plastic are positioned apart from each other in the longitudinal direction, and the first and second guide members 103 and 104 are combined in the longitudinal direction between both ends of the third and fourth guide members 101 and 102, to thereby complete the assembly-type heat-radiating cartridge 300b.

Here, coupling grooves 101a, 101b, 102a, and 102b may be formed in the third and fourth guide members 101 and 102 and coupling bars 103a, 103b, 104a, and 104b which are inserted into and coupled to the coupling grooves 101a, 101b, 102a, and 102b of the third and fourth guide members 101 and 102, may be formed at both ends of the first and second guide members 103 and 104.

Therefore, in the third embodiment of the present disclosure, the coupling bars 103a, 103b, 104a and 104b of the first and second guide members 103 and 104 are inserted into and coupled to the coupling grooves 101a, 101b, 102a, and 102b of the third and fourth guide members 101 and 102, to thereby complete the assembly-type heat-radiating cartridge 300b.

In this case, the first and second guide members 103 and 104 may be provided with the coupling grooves 101a, 101b, 102a and 102b, and the third and fourth guide members 101 and 102 may be provided with the coupling bars 103a, 103b, 104a and 104b, to thereby form a protrusion-groove coupling relationship.

As shown in FIG. 14, the assembly-type heat-radiating cartridge 300b according to the third embodiment includes a battery receiving penetration hole 110 for accommodating a battery in a central region of the assembly-type heat-radiating cartridge 300b after assembly, and a seating portion 120 for seating the battery 200 is formed on the side wall of the battery receiving penetration hole 110.

To this end, the third and fourth guide members 101 and 102 and the first and second guide members 103 and 104 are integrally formed with partial seating portions 120a to 120d, which are required to form the seating portion 120.

It is preferable that the first and second guide members 103 and 104 should be made of an aluminum material having excellent thermal conductivity and low cost.

Referring to FIG. 14, in the assembly-type heat-radiating cartridge 300b according to the third embodiment of the present disclosure, when assembling the first and second guide members 103 and 104 to the third and fourth guide members 101 and 102, an assembly-type heat-radiating cartridge 300 having a rectangular ring shape is obtained. As a result, a battery receiving penetration hole 110 is formed in the center region of the assembly-type heat-radiating cartridge 300b and the partial seating portions 120a to 120d are assembled on the side walls of the battery receiving penetration hole 110 and thus the seating portion 120 for seating the battery 200 is provided at the same time.

Figure 17:
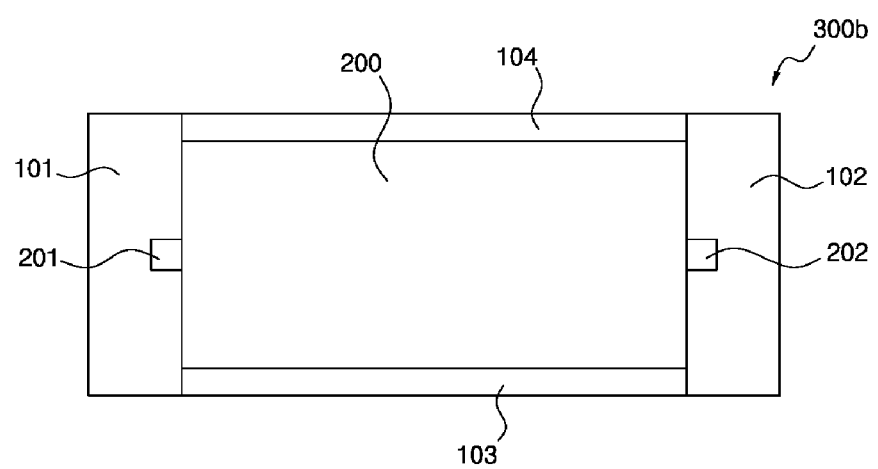
FIG. 17 is a plan view showing a state in which a battery is mounted in the assembly-type heat-radiating cartridge according to the third embodiment of the present disclosure.
Figure 18:
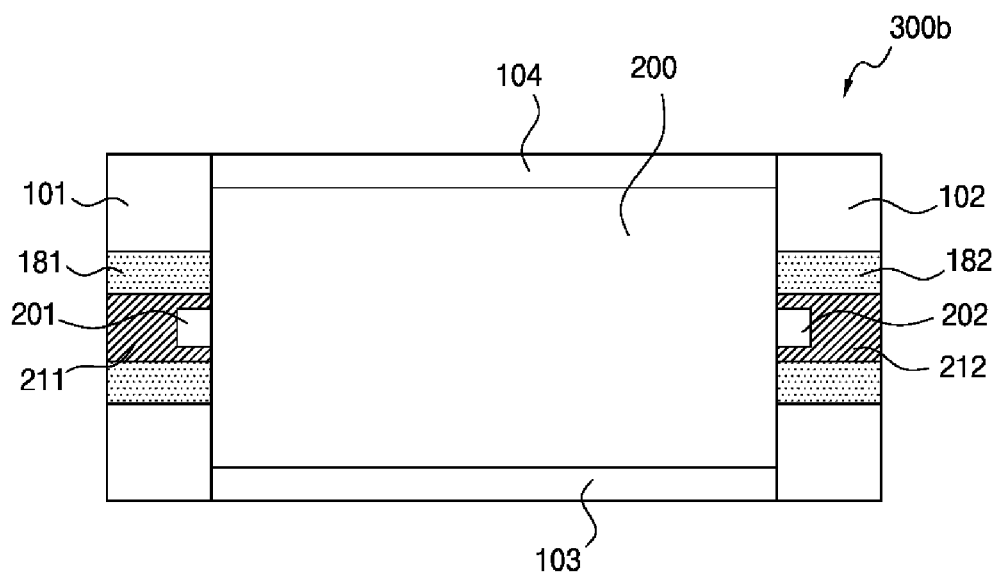
FIG. 18 is a plan view showing a state in which a battery is mounted in the assembly-type heat-radiating cartridge in which a thermally conductive insulating member is heterogeneously double-shot injected according to the third embodiment of the present disclosure.

Therefore, in the third embodiment of the present disclosure, the first and second guide members 103 and 104 are detachably coupled to the third and fourth guide members 101 and 102 to thus implement the rectangular ring-shaped assembly-type heat-radiating cartridge 300. Accordingly, the battery 200 can be mounted on the seating portion 120 of the battery receiving penetration hole 110 of the assembly-type heat-radiating cartridge 300b as shown in FIG. 17.

Here, the plastic for forming the third and fourth guide members 101 and 102 may be a thermally conductive non-insulating plastic or a thermally conductive insulating plastic, and may also be engineering plastics.

Further, the thermally conductive non-insulating plastic may be a moldable non-insulating resin obtained by dispersing electrically conductive heat-radiating fillers made of a material such as graphene and carbon, and may be used to implement the third and fourth guide members 101 and 102 having excellent thermal conductivity and electrical conductivity.

In addition, the thermally conductive insulating plastic may be a moldable insulating resin obtained by dispersing insulating heat-radiating fillers such as BN, AlN, MgO, $Al_2O_3$, and $SiO_2$ and may be used to implement the third and fourth guide members 101 and 102 having excellent thermal conductivity and electrical insulating property.

In addition, engineering plastics have excellent properties such as impact resistance, abrasion resistance, heat resistance, cold resistance, chemical resistance and electrical insulating as well as strength and elasticity. Therefore, strength is high and no deformation occurs in the case of the engineering plastics, to thus third and fourth guide members 101 and 102.

Figure 15A:
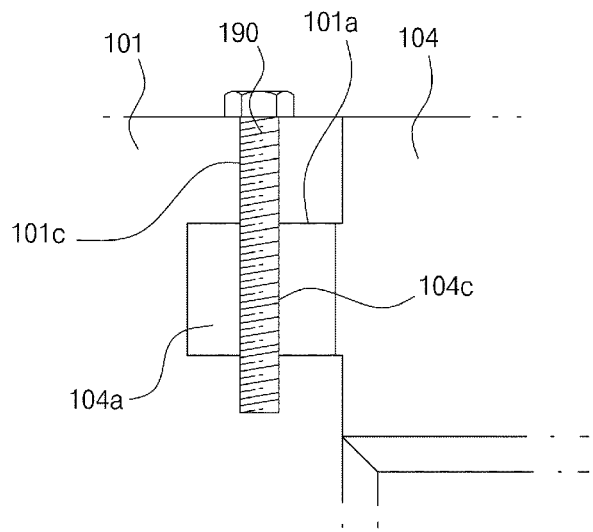
FIGS. 15A and 15B are partial cross-sectional views illustrating a method of assembling an assembly-type heat-radiating cartridge according to the third embodiment of the present disclosure.
Figure 15B:
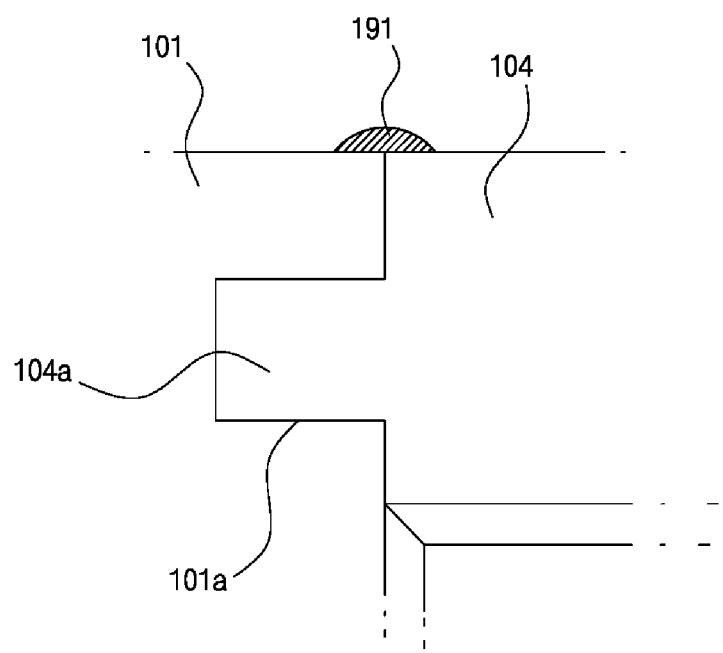

Referring to FIGS. 15A and 15B, in the third embodiment of the present disclosure, the first and second guide members 103 and 104 are coupled to the third and fourth guide members 101 and 102 using fastening pins and a bonding resin, to thus assemble the assembly-type heat-radiating cartridge.

That is, as shown in FIG. 15A, in order to couple the coupling bars 103a, 103b, and 103b of the first and second guide members 103 and 104 to the coupling grooves 101a, 101b, 102a, and 102b of the third and fourth guide members 101 and 102, respectively, in a vertically penetrative manner, fastening grooves 101c and 104c are formed in the coupling bars 103a, 103b, 104a,1 and 04b of the third and fourth guide members 101 and 102 and the first and second guide members 103 and 104.

Therefore, in a state where the coupling bars 103a, 103b, 104a and 104b of the first and second guide members 103 and 104 are coupled with the coupling grooves 101a, 101b, 102a and 102b of the third and fourth guide members 101 and 102, respectively, a fastening pin 190 is fastened to and assembled with the fastening grooves 101c and 104c of the third and fourth guide members 101 and 102 and the first and second guide members 103 and 104.

It is also possible for the coupling between the first and second guide members 103 and 104 and the third and fourth guide members 101 and 102 to be coupled in a snap coupling manner without using the fastening pin 190.

As shown in FIG. 15B, the coupling bars 103a, 103b, 104a, and 104b of the first and second guide members 103 and 104 are engaged with the coupling grooves 101a, 101b, 102a and 102b of the third and fourth guide members 101 and 102, respectively, and then the first and second guide members 103 and 104 and the third and fourth guide members 101 and 102 may be sealed with a bonding resin 191 to then be assembled therebetween.

Here, the first and second guide members 103 and 104 and the third and fourth guide members 101 and 102 may be bonded to each other by the bonding resin 191. However, in a state where the first and second guide members 103 and 104 and the third and fourth guide members 101 and 102 are bonded to each other by the bonding resin 191, the boundary surfaces exposed to the outside of the first and second guide members 103 and 104 and the third and fourth guide members 101 and 102 are sealed with the bonding resin 191 so that the bonding state can be more firmly strengthened.

Figure 16:
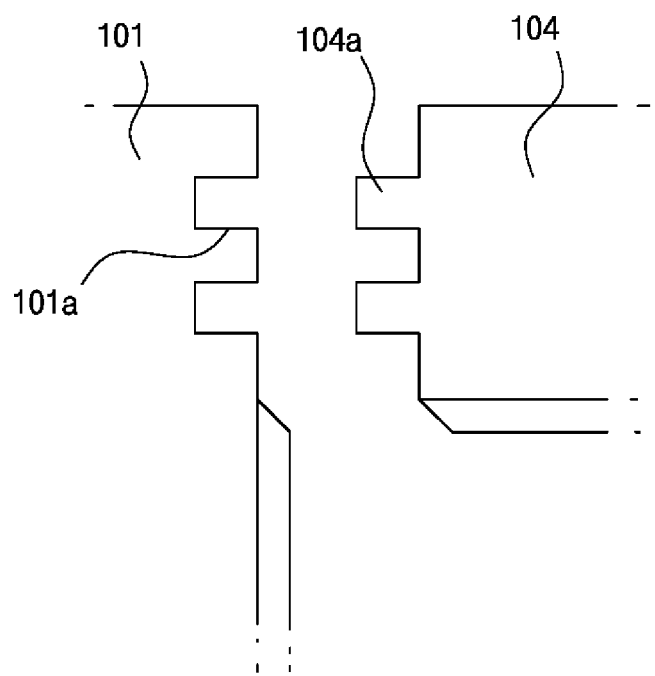
FIG. 16 is a partial cross-sectional view for explaining a method of assembling the assembly-type heat-radiating cartridge by a coupling groove and a coupling bar according to the third embodiment of the present disclosure.

Further, as shown in FIG. 16, a plurality of coupling bars 104a are formed at both ends of the first and second guide members 103 and 104, and a plurality of coupling grooves 101a corresponding to the plurality of coupling bars 104a are also formed, to thus improve the bonding strength.

As described above, in the third embodiment of the present disclosure, when the third and fourth guide members 101 and 102 are formed of the thermally conductive non-insulating plastic, a thermally conductive insulating plastic is double-shot injection molded on the third and fourth guide members 101 and 102 to constitute thermally conductive insulating members 181 and 182, so as to be insulated when the electrode terminals 201 and 202 of the battery 200, and the conductive connecting members 211 and 212 connected to the electrode terminals 201 and 202 contact each other.

Therefore, the battery 200 is seated on the assembly-type heat-radiating cartridge and the electrode terminals 201 and 202 of the battery 200 are brought into contact with the thermally conductive insulating members 181 and 182 to maintain an electrically insulated state with respect to the thermally conductive insulating members 181 and 182 made of the thermally conductive insulating plastic.

In addition, the electrode terminals 201 and 202 are electrically connected to the conductive connecting members 211 and 212 for connecting to the electrode terminals of the battery 200 mounted on the neighboring assembly-type heat-radiating cartridge. Here, the conductive connecting members 211 and 212 surround and come in contact with the thermally conductive insulating members 181 and 182 to keep an electrically isolated state from the assembly-type heat-radiating cartridge.

Further, in the third embodiment of the present disclosure, the first guide member 103 may be also polished on the side thereof in close contact with the heat exchanger in the same manner as in the first embodiment, and heat-radiating irregularities 104a may be also formed on the side surfaces exposed to the outside of the second guide member 104 spaced apart from the first guide member 103.

Therefore, in the assembly-type heat-radiating cartridge according to the embodiment of the present disclosure, the outer surface of the polished first guide member 103 is completely adhered to the heat exchanger, so that there is an advantage that the heat of the battery transferred to the first guide member 103 is rapidly radiated through the heat exchanger.

In addition, in some embodiments of the present disclosure, the heat-radiating irregularities 104a are formed on the side surface exposed to the outside of the second guide member 104. The heat-radiating irregularities increase the contact area with the outside air, thereby improving the heat-radiating efficiency of the heat transmitted to the second guide member 104.

That is, the battery 200 mounted on the assembly-type heat-radiating cartridge 300b generates heat by charging and discharging of the battery 200, and the heat is cooled by the heat exchanger 500 in close contact with the fist guide member 103 of the assembly-type heat-radiating cartridge 300b and is discharged through the heat-radiating irregularities of the second guide member 104, so that the heat-radiating efficiency can be improved.

In the above description, the conductive connecting members 211 and 212 are applied to the second embodiment. However, in the first and third embodiments, the conductive connecting members 211 and 212 may be also formed in the portions of the third and fourth guide members, which are in contact with the both-end electrode terminals of the battery and may be installed for electrical connecting with a battery placed between the adjacent heat-radiating cartridges.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the disclosure without departing off the spirit of the present disclosure.

INDUSTRIAL APPLICABILITY

The present disclosure can be applied to a heat-radiating cartridge that improves heat-radiating capability, does not cause deformation, and has excellent rigidity, and a battery pack for an electric vehicle using the same.

What is claimed is:
1. A heat-radiating cartridge comprising:
first and second guide members that are spaced apart from each other, wherein the first and second guide members are formed of a thermally conductive non-insulating plastic and capable of supporting both longitudinal sides of a battery;
third and fourth guide members connected to both ends of the first and second guide members, respectively, to form a battery receiving penetration hole surrounded by the first, second, third and fourth guide members, wherein the third and fourth guide members are formed of a thermally conductive insulating plastic; and
a seating portion protruding from a sidewall of the battery receiving penetration hole, the battery being capable of being seated on the seating portion,
wherein each of the third and fourth guide members includes a thermally conductive insulating member, the thermally conductive insulating member includes a conductive connecting member, and the conductive connecting member is configured to be in contact with an electrode terminal of the battery and simultaneously with a conductive connecting member of a neighboring heat-radiating cartridge.

2. The heat-radiating cartridge of claim 1, wherein the first guide member includes a polished side surface with which a heat exchanger is capable of being in contact, and an exposed outer surface of the second guide member includes heat-radiating irregularities formed thereon.

3. The heat-radiating cartridge of claim 2, further comprising a thermal interface material (TIM) coated on the polished side surface of the first guide member and an emissive coating layer formed on the exposed outer surface of the second guide member, to thereby increase heat-radiating performance.

4. The heat-radiating cartridge of claim 1, wherein the thermally conductive non-insulating plastic comprises an electrically conductive heat-radiating filler dispersed therein, and the thermally conductive insulating plastic comprises an insulating heat-radiating filler dispersed therein.

5. The heat-radiating cartridge of claim 1, further comprising a thermal interface material (TIM) formed on a surface of the seating portion.

6. The heat-radiating cartridge of claim 1, wherein the first and second guide members are detachably coupled with the third and fourth guide members.

7. The heat-radiating cartridge of claim 6, wherein the first and second guide members are coupled with the third and fourth guide members by using a coupling groove and a coupling bar.

8. A battery pack for an electric vehicle, the battery pack comprising:
    a plurality of heat-radiating cartridges stacked in a vertical direction or disposed adjacent to each other in a horizontal direction; and
    a plurality of batteries inserted and disposed between the plurality of heat-radiating cartridges, wherein each of the plurality of heat-radiating cartridges comprises: a heat-radiating cartridge according to claim 1.

9. The battery pack for an electric vehicle of claim 8, further comprising a heat exchanger contacting a polished side surface of the first guide member.

10. The battery pack for an electric vehicle of claim 8, wherein the plurality of batteries include a pouch-type.

\* \* \* \* \*